J. H. BATCHELOR.
VAPORIZER.
APPLICATION FILED OCT. 24, 1917.

1,347,435.

Patented July 20, 1920
2 SHEETS—SHEET 1.

Inventor
JAMIE H. BATCHELOR.
By Watson E. Coleman
Attorney

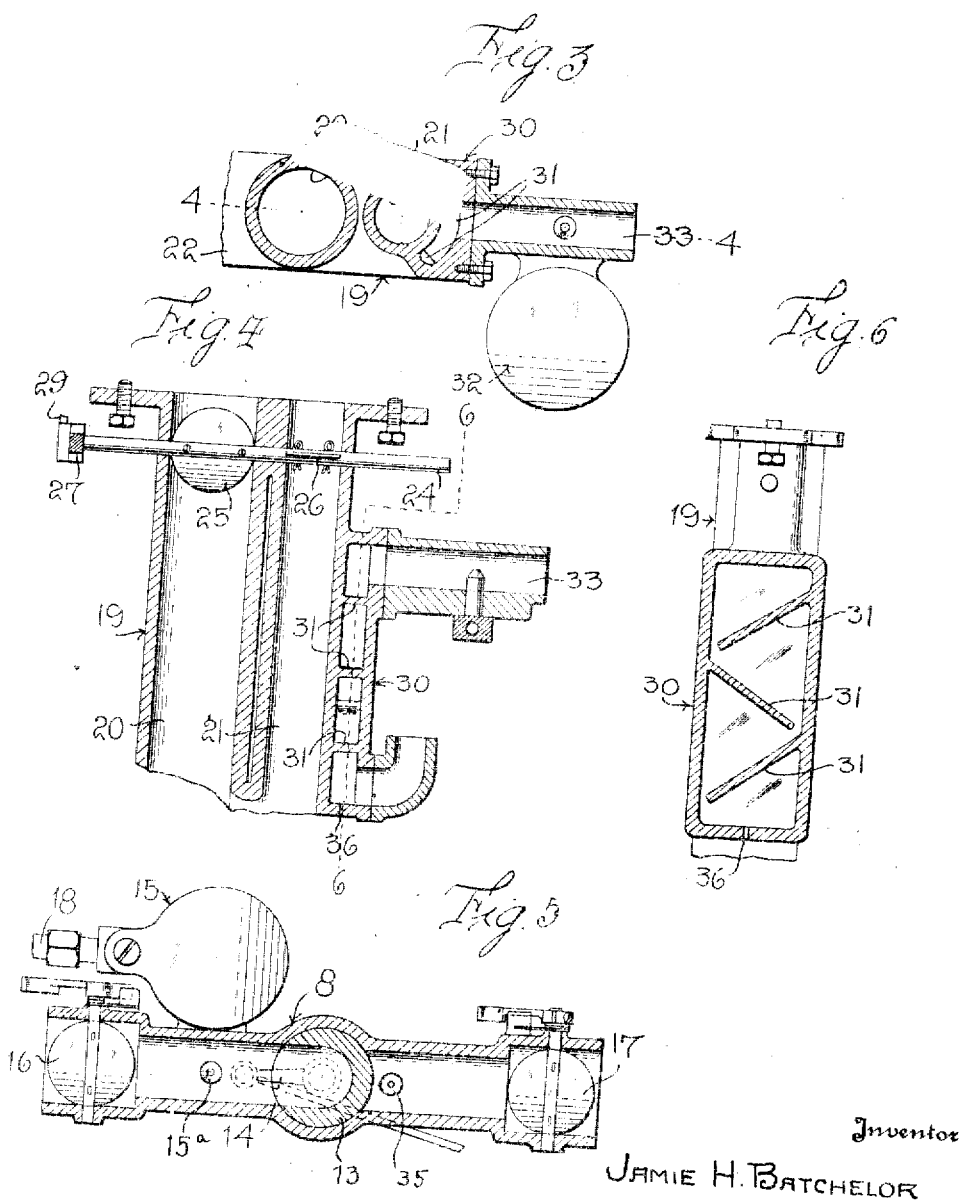

UNITED STATES PATENT OFFICE.

JAMIE H. BATCHELOR, OF SAVANNAH, GEORGIA, ASSIGNOR TO CARL ESPY, OF SAVANNAH, GEORGIA.

VAPORIZER.

1,347,435.

Specification of Letters Patent.

Patented July 20, 1920.

Application filed October 24, 1917. Serial No. 198,296.

*To all whom it may concern:*

Be it known that I, JAMIE H. BATCHELOR, a citizen of the United States, residing at Savannah, in the county of Chatham and State of Georgia, have invented certain new and useful Improvements in Vaporizers, of which the following is a specification, reference being had to the accompanying drawings.
This invention relates to an improved device for utilizing heavy hydrocarbon fuels such as kerosene and the like as fuel for internal combustion engines and has for its primary object to provide means for automatically controlling the temperature of the fuel supplied to the engine in inverse ratio with the opening of the throttle valve.

It is another and more particular object of the invention to provide in a device for the above purpose, exhaust receiving passages and valves for controlling the supply of the exhaust gases to said passages, the wall of one of the outlets having a jacket forming a fuel preheating and a carbureting chamber and provide means for supplying the primary mixture of air and fuel to said chamber and a supply connection between said chamber and an auxiliary air inlet passage to the intake manifold.
It is another object of the invention to provide a device for utilizing the lower grades of hydrocarbon fuels in the operation of internal combustion engines, wherein the fuel is preheated but the heating of the fuel through the medium of the exhaust gases is decreased in temperature in proportion to the increase in the heat of compression in the engine cylinders.

It is also a further general object of my present invention to provide a device which will accomplish the above purpose in a highly satisfactory manner and with a minimum consumption of the fuel, the device as a whole being quite simple in its construction and capable of use in connection with many of the various types of carbureters now in general use.

A further object is to provide in a device of the character described means to prevent any volatilized liquid fuel from entering the engine by the provision of a drain pipe in the carbureting and preheating chamber.

A further object is to provide means permitting the entrance of air in regulated amounts into the mixing chamber into which the vaporized fuel is carried, not only to control the richness of the mixture, but also to provide for a supply of cold air to the mixture to thereby prevent the temperature of the mixture being too high when it enters the engine.

A further object is to provide means whereby all of the exhaust gases may be utilized to preheat and vaporize the liquid fuel passing through the carbureting and vaporizing chamber or whereby only a portion of the exhaust may be utilized for this purpose, the remaining portion of the exhaust passing off without exerting any heating effect, or whereby all of the exhaust may be discharged without exerting any heating effect on the liquid fuel.

With the above and other objects in view the invention consists in the improved construction, combination and arrangement of the several parts as will be hereinafter more fully described, subsequently claimed and illustrated in the accompanying drawings in which similar reference characters designate corresponding parts throughout the several views and wherein;

Fig. 3 is a horizontal section through the kerosene carbureter taken on the line 3—3 of Fig. 4;

Fig. 4 is a vertical section taken on the line 4—4 of Fig. 3;

Fig. 5 is a horizontal sectional view through the gasolene and kerosene supply conduit to the intake manifold; and

Fig. 6 is a section taken on the line 6—6 of Fig. 4.

Figure 1:
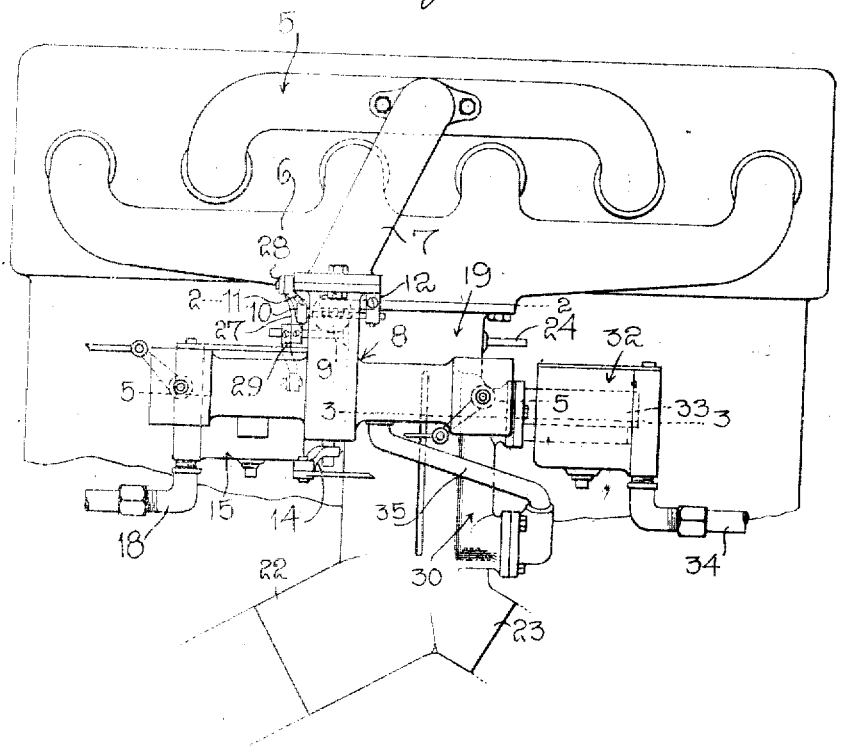
Figure 1 is a side elevation illustrating one embodiment of my invention applied to a motor vehicle engine.
Figure 2:
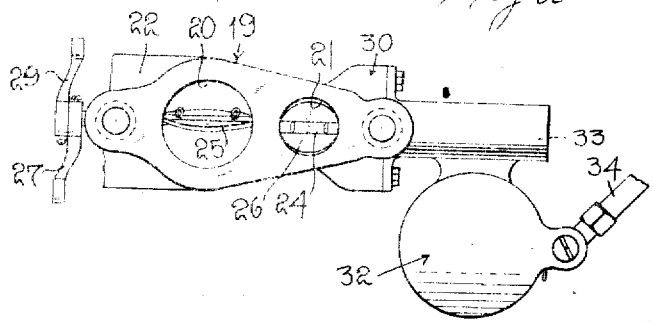
Fig. 2 is a top plan view of the fuel heater illustrated in Fig. 4 and showing the arrangement of the exhaust control valves.

Referring in detail to the drawings, 5 designates the intake manifold of a motor vehicle engine and 6 the exhaust manifold thereof. An angular leg 7 is centrally connected to the intake manifold, and to the lower end of this leg 7 is attached the T-shaped supply connection generally indicated by the numeral 8. In the upper end of the central vertical portion of the supply connection 8 the usual throttle valve indicated at 9 is mounted upon a rotary shaft 10. On one end of said shaft an arm 11 is fixed. A suitable stop 12 is fixed on the other end of the shaft 10 to limit the movement of the throttle valve at its open and closed positions.

In the lower end of the central vertical portion of the connection 8, as shown in Fig. 5 a two-way valve 13 of the ordinary type is mounted and operated through suitable connections to the arm indicated at 14. A gasolene receiving chamber 15 is suitably mounted at one side of the vertical portion of the connection 8 and preferably has a single jet discharge nipple 15ª extending upwardly into the horizontal passage thereof. In both ends of the horizontal portion of the connection 8, air inlet valves 16 and 17 are mounted, said valves preferably being of the butterfly type. 18 designates the supply connection leading from the gasolene tank to the float chamber 15.

For the purpose of preheating and vaporizing liquid fuel, I bolt or otherwise attach to the under side of the exhaust manifold 6 at the center thereof the upper end of a casting 19. This casting is provided with vertical conduits or passages 20 and 21 respectively of relatively different diameters, to receive the exhaust gases. The lower ends of these passages communicate respectively with the discharge outlets 22 and 23. A shaft 24 extends diametrically through the passages 20 and 21 at their upper ends and to said shaft the valve disks 25 and 26 respectively are fixed, said disks being disposed in planes at right angles with respect to each other and within the passages 20 and 21 respectively. An arm 27 fixed on one end of the shaft 24 is connected by a rod 28 to the arm 11 on the shaft of the throttle valve 9, and to a second arm 29 on the shaft 24, pedal operated means is connected whereby the valves 25 and 26 and the throttle valve 9 may be manually controlled. Any other means than a pedal operated means, however, may be used for this purpose.

On the outer wall of the smaller passage 21 for the exhaust gas, a jacket 30 is integrally cast, and a series of obliquely disposed baffle plates 31 alternately extending in relatively opposite directions are arranged between the spaced walls for the purpose of interrupting the descent of the motive fluid and maintaining the same in contact with the heated wall of the passage 21 for a relatively long period of time. To the upper end of the jacket 30 is attached a float chamber 32 to receive the kerosene or other low grade of hydrocarbon fuel, said chamber also having a single jet nipple projecting into the air intake passage 33 which passage is open at all times and directly communicates with the upper end of the space between the jacket wall and the wall of the passage 21. The kerosene is supplied from a tank or other suitable receptacle to the float chamber through the pipe 34. 35 designates the outlet pipe attached to the lower end of the jacket 30, the other end of said pipe leading into the connection 8 inward of the valve 17.

In the operation of the device as above described, it will be understood that when the engine is not running and the throttle valve is closed, the valve 26 will be wide open so that the heat from the engines may pass downward through the passage 21 and heat the contents of the jacket 30 and that when the engine is first started, the two-way valve 13 is shifted so that gasolene vapor will be initially supplied to the engine cylinders and communication cut off between the inlet manifold and that portion of the connection 8 which communicates with the kerosene heater and vaporizer 30. After the engine has been started, the valve 13 is shifted to cut off communication between the manifold and the gasolene supply and open the kerosene supply connection. When the throttle valve 9 is only slightly open and the cylinders are relatively cold, the valve 26 is practically fully opened and the valve 25 is nearly closed. Thus, at this time, the greater part of the exhaust gas from the engine cylinders is discharged to the atmosphere through the passage 21. The valve 17 at this time may be closed or only partially open. Thus, as the vacuum due to the suction stroke of the pistons draws the air into the primary air inlet passage 33 it strikes the fuel delivered from the jet nipple so that the fuel is carried into the carbureting chamber formed by the jacket wall 30. The rich mixture of fuel and air passes downwardly around and between the baffle plates 31 and as the adjacent wall of the passage 21 becomes highly heated by conduction of the heat from the exhaust gases passing therethrough, the mixture is also heated and partially vaporized. Finally, the gaseous mixture is delivered by the pipe 35 to the supply connection 8 where more or less air is mixed therewith (depending upon the adjustment of the valve 17) and the mixture drawn past the throttle valve 9 into the intake manifold. The heat of compression in the cylinder completes the final vaporization of the mixture so that proper combustion thereof is assured. As the cylinders become hotter and the throttle valve 9 is opened wider the valve 26 in the passage 21 is simultaneously moved toward its closed position, the valve 24 in the main exhaust discharge passage 20 is gradually opened wider to thus reduce the amount of heated exhaust gases passing through the passage 21 and divert a constantly increasing amount of exhaust gases through the passage 20. The preliminary heating of the primary mixture of kerosene and air is reduced proportionately to the increase in the heat of compression in the engine cylinder. A richer mixture will therefore be supplied to the intake manifold, or in other words more fuel will be delivered to the engine cylinder in the subsequent operation of the engine. In such instances, the heavy fuel may accumulate in the lower end of the jacket on the casting 19, and when the engine is not in operation clog the outlet into the pipe 35, or in the operation of the engine pass into the cylinders in a liquid state. I therefore provide the drain port indicated at 36 at the lowest point of the chamber 30 so that such unvaporized fuel may readily find an outlet.

From the foregoing description taken in connection with the accompanying drawings, the construction, manner of operation and several advantages of my invention will be readily understood. By means of the device, I am enabled to use kerosene and other low grade fuels for motor vehicle engines with highly satisfactory results. By the operation of the exhaust control valves 25 and 26 in unison with the throttle valve, a preheating of the kerosene and air to the proper degree for its final vaporization by the heat of the compression in the engine cylinder, is assured and as air is mixed with the kerosene fuel prior to the heating thereof as well as subsequently, the danger of an overrich mixture being drawn into the engine cylinder is obviated. It will therefore be seen that appreciable economy may be realized in the operation of motor vehicle engines by means of the present invention. The valve 17 may be regulated to control the amount of auxiliary air passing into the mixing chamber formed by the connection 8 and thus the richness of the mixture may be readily controlled or cold air may be admitted to thereby prevent the temperature of the mixture, when admitted to the engine, being too high. Furthermore, this valve 17 will, to a considerable extent, control the suction through the inlet tube 33 and downward through the vaporizing chamber 30 and through the pipe 35. It will be noted that the pipe 35 is downwardly inclined so that any condensed gas or vapor which may collect in the pipe 33 will run down this pipe and be discharged into the lower end of the chamber 30 and thus be discharged through the drainage opening 36. The device readily lends itself to use in connection with various types of fuel carbureters and the invention is accordingly not to be limited to the float controlled fuel supply means which I have herein referred to and illustrated in the accompanying drawings. The device is likewise susceptible of many other modifications in the proportion and relative arrangement of its several parts, and I therefore reserve the privilege of adopting all such legitimate changes as may be fairly embodied within the spirit and scope of the invention as claimed.

It will be seen that I have provided means whereby the manifold of an engine may be connected either to a source of gasolene or like highly volatile fuel, or to a source of kerosene or like low grade fuel, and that I have provided means whereby the low grade fuel may be vaporized either by the heat of the cylinders themselves when the engine has been running for some time, or by the heat of the exhaust when the engine is initially started, and provide means whereby this second named source of heat is automatically reduced or cut off entirely in correspondence with the opening of the throttle valve so as to prevent the mixture from being too highly heated when it enters the cylinders and thus preventing all chances of pre-ignition or undue carbonization of the fuel within the cylinders. It will further be seen that I have provided means whereby air to a proper and regulatable amount may be admitted and mixed with the gasolene or highly volatile fuel, or mixed to a greater or less amount with the vaporized mixture of fuel and primary air coming from the carbureting and preheating chamber.

Having thus fully described my invention, what I claim and desire to secure by Letters Patent is:—

1. The combination with a fuel supply connection to the intake manifold of an internal combustion engine and throttle valve, of a casting secured to the exhaust manifold of the engine and having spaced exhaust receiving passages, the wall of one of said passages being provided with an exterior jacket, means for supplying a mixture of fuel and air to the upper end of said jacket, a connection between the lower end of the jacket and the supply connection on the intake manifold, valves to control the passage of the exhaust gases into said passages and to simultaneously open one of said passages when the other is closed, and means for operating said valves in unison with the throttle valve.

2. A device for utilizing low grade hydrocarbon fuels for the propulsion of internal combustion engines comprising a part adapted to be connected to the exhaust manifold of the engine and depending vertically therefrom, said part having a passage for the exhaust gases and being exteriorly formed upon one side with a jacket, a series of vertically spaced baffles integrally connecting the outer jacket wall to the opposed wall of said part, said jacket having an air inlet connection at its upper end, means for delivering a fuel jet into the air inlet connection for mixture with the air, and means connecting the lower end of the jacket to the intake manifold of the engine, the wall of the jacket being provided at its lower end with a drain port for the escape of liquid fuel accumulating therein.

3. Means for preheating and vaporizing liquid low grade hydrocarbons as fuel for internal combustion engines including an element adapted to be connected to the exhaust manifold of the engine and depending therefrom, said element being formed to provide separate exhaust conduits, valves disposed in the inlet ends of said conduits, said valves being so disposed that as one valve closes the other opens to thereby cause the exhaust from the manifold to pass through one or the other of said conduits or be divided into two streams passing through both of said conduits, said element having a vaporizing and preheating chamber associated with one of said conduits but entirely separated from the other of said conduits, means for delivering a mixture of air and fuel to the upper end of the vaporizing chamber, and means whereby the lower end of said chamber may be connected to the intake manifold of the engine, said means extending upward from the lower end of the vaporizing chamber, and the lower end of the vaporizing chamber being provided with a drainage opening.

4. The combination with an internal combustion engine having an intake manifold and an exhaust manifold and a throttle valve, of a pair of exhaust pipes connected to the exhaust manifold, one of said pipes having a jacket, means for discharging liquid fuel and air into one end of the jacket, a mixing chamber forming part of the intake manifold and having two branches, a valve in the mixing chamber adapted to establish communication between either branch and the mixing chamber and cut off communication from the other branch, both of said branches having openings therein for the admission of air and having adjustable valves controlling the entrance of air, one of said branches having means for discharging fuel thereinto, means for conducting vaporized fuel from the heating jacket into the other of said branches, and means connected to the throttle valve of the engine for directing all of the exhaust vapor through the pipe having the jacket on the wall thereof, all of the exhaust vapor through the other pipe of the pair or directing the exhaust vapor partly through both pipes.

5. The combination with an internal combustion engine having an intake manifold, an exhaust manifold and a throttle valve controlling passage through the intake manifold, of a pair of exhaust pipes connected to the exhaust manifold and extending parallel to each other, one of said pipes having a vertically extending jacket, means for discharging liquid fuel and air into the upper end of the jacket, a mixing chamber forming part of the intake manifold and having two oppositely extending branches open at their ends, a valve in the mixing chamber adapted to establish communication between either branch of the mixing chamber and cut off communication with the other branch, valves controlling the inlet of air to each branch, means for discharging fuel into one of said branches, a conducting pipe leading from the lower end of the jacket into the other of said branches and discharging vaporized fuel therein, a pair of valves disposed within said exhaust pipes and controlling the passage of exhaust therethrough, said valves being mounted upon a common stem and so set that when one of the valves is fully closed, the other is fully opened, and means operatively connecting said stem to the throttle valve to move coincidently therewith, such means being so connected to the throttle valve that when the throttle valve is partly closed, all of the exhaust will pass through the pipe having the jacket and when the throttle valve is fully opened, all of the exhaust will pass through the other pipe, and passage through the pipe having the jacket will be cut off.

6. The combination with an internal combustion engine having an intake manifold and exhaust manifold, of a mixing chamber connected at one end to the intake manifold and having two branches adjacent its other end, a throttle valve disposed in the upper end of the mixing chamber, means for discharging fuel and air into one of said branches, the other branch having an open end, a valve controlling the inlet of air through said open end of the branch, a fuel preheating chamber connected to a source of fuel and air and connected to said second named branch between the valve therein and the mixing chamber, means for heating said preheating chamber by the heat of the exhaust, and means for controlling the heating of said preheating chamber, said means being connected to operate with the throttle valve.

In testimony whereof I hereunto affix my signature in the presence of two witnesses.

JAMIE H. BATCHELOR.

Witnesses:
 M. C. LYDDANE,
 M. R. WILSON.